(12) United States Patent
Ai

(10) Patent No.: US 6,745,882 B2
(45) Date of Patent: Jun. 8, 2004

(54) LOCKING CLUTCH

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/264,514

(22) Filed: Oct. 4, 2002

(65) Prior Publication Data

US 2003/0121745 A1 Jul. 3, 2003

Related U.S. Application Data

(63) Continuation-in-part of application No. 10/171,710, filed on Jun. 14, 2002, which is a continuation-in-part of application No. 10/034,653, filed on Dec. 27, 2001, now abandoned.

(51) Int. Cl.$^7$ .................... F16D 11/14; F16D 11/16
(52) U.S. Cl. .............. 192/48.8; 192/65; 192/69.6; 192/69.61; 192/69.9; 192/108
(58) Field of Search ............... 192/69.61, 69.62, 192/69.9, 69.91, 108, 48.8, 48.91, 39, 65, 71, 107 T

(56) References Cited

U.S. PATENT DOCUMENTS

| | | | |
|---|---|---|---|
| 1,618,470 A | | 2/1927 | Patterson |
| 1,646,646 A | | 10/1927 | Gaylord |
| 2,501,648 A | * | 3/1950 | Ogden ............... 192/69.91 |
| 2,743,804 A | | 5/1956 | Roberts |
| 2,812,840 A | | 11/1957 | Winter et al. |
| 2,966,974 A | | 1/1961 | Paskowski et al. |
| 3,115,348 A | * | 12/1963 | Penland ............... 192/69.91 |
| 3,750,424 A | * | 8/1973 | Nettleton ............... 192/71 |
| 3,752,278 A | | 8/1973 | States |
| 4,222,472 A | | 9/1980 | Telford |
| 4,417,650 A | | 11/1983 | Geisthoff |
| 4,977,989 A | | 12/1990 | Ashikawa et al. |
| 5,839,556 A | | 11/1998 | Crawford et al. |
| 6,112,873 A | | 9/2000 | Prasse et al. |
| 6,206,162 B1 | | 3/2001 | Stones et al. |
| 6,276,043 B1 | * | 8/2001 | Marsic ............... 192/108 |
| 6,409,000 B1 | | 6/2002 | Itoh et al. |

OTHER PUBLICATIONS

G. Lechner & H. Naunheimer—Fahrzeug–getriebe, Grundlagen, Auswahl, Auslegung und Konstruktion—Stuttgart, inMay 1994.

* cited by examiner

Primary Examiner—Rodney H. Bonck
(74) Attorney, Agent, or Firm—Polster, Lieder, Woodruff & Lucchesi L.C.

(57) ABSTRACT

A locking clutch comprises a toothed member and a slide assembly which are connectable to drive and driven parts. The two members are movable between an engaged position in which the clutch transfers power and/or torque to the driven part and a disengaged position in which power and/or torque is not transferred. The toothed member comprises a cylindrical surface and a plurality of teeth spaced about and extending from the cylindrical surface. The slide assembly comprises a body having a circumferential surface with a plurality of channels formed in said surface. Slide members are received in the channels to be movable between an extended position in which they can engage the teeth of the toothed member and a retracted position in which they do not engage the teeth of the toothed member. A resilient member biases the slide members to their extended positions. The slide assembly can be formed so that the slide members move either axially or radially relative to the slide assembly body.

24 Claims, 13 Drawing Sheets

LOCKING CLUTCH

CROSS-REFERENCE TO RELATED APPLICATIONS

This application is a continuation-in-part of application Ser. No. 10/171710 filed Jun. 14, 2002, which is a continuation-in-part of application Ser. No. 10/034,653, filed Dec. 27, 2001, both of which are entitled "Locking Clutch", and both of which are incorporated herein by reference.

STATEMENT REGARDING FEDERALLY SPONSORED RESEARCH OR DEVELOPMENT

Not Applicable.

BACKGROUND OF THE INVENTION

This invention relates to clutches, and, in particular, to a locking clutch that connects two or more mechanical components together for torque and/or power transmission.

Various clutching devices are used to selectively connect mechanical components together so that they can rotate at the same angular speed about a common axis, allowing torque and power to be transmitted from one component to the other. There are two common types of clutches: (1) progressive engagement clutches, such as friction clutches or multi-disc clutches; and (2) positive engagement clutches, such as dog clutches. A friction clutch assembly usually contains two sets of friction plates mounted respectively to driving and driven parts. It relies on friction force to transmit torque and power. The friction clutch provides high performance at differential speed engagement. Frictional clutches are widely used in automotive transmissions. The construction of a friction clutch, however, is very complex, involving frictional materials and usually requiring hydraulic systems to provide and maintain adequate normal forces. Consequently, the costs associated with design and manufacture of friction clutches are high. In addition, the power losses of running the hydraulic system associated with friction clutches are high.

Positive engagement clutches, such as dog clutches, are much simpler in construction. A dog clutch typically includes a pair of jaws directed towards each other for engaging or disengaging the driving and driven parts. Dog clutches are used in hydro-mechanical transmissions and other continuously variable transmissions. They are also used in four-wheel drive vehicles for engaging the secondary driving wheels. However, the engagement is not always trouble free. There are times when the jaws of one member are not aligned up well with the grooves on the mating member. In this instance, the jaws will not engage into the grooves no matter what force is used to push the two members together.

BRIEF SUMMARY OF THE INVENTION

The present invention relates to a positive clutch that connects two or more mechanical components together for torque and power transmission. The two components (i.e., the drive and driven parts) can be engaged under any angular alignment condition, thus, making engagement of the two components easier. Further, the required engagement force is small and little or no power is needed to maintain the engagement of the two components of the clutch.

Briefly stated, a locking clutch of the present invention comprises a toothed member and a slide assembly. The toothed member is connected to a drive part; and the slide assembly is connected to a driven part, or vice versa. The toothed member and the slide assembly can be brought into or out of engagement to transfer, or stop the transfer of, power and/or torque from the drive part to the driven part.

The toothed member comprises a cylindrical surface and a plurality of teeth spaced about and extending from the cylindrical surface. The slide assembly includes a body and plurality of slide members which are received in channels in the body. The slide members are movable between a retracted position and an extended position relative to the channels. A biasing element biases the slide members to their extended position.

The teeth of the toothed member are spaced apart to define a gap between the teeth. The gap has a width, at the outer ends of the teeth, at least as large as the width of the slide members to allow the slide members to be received in the gap. When the toothed member and the slide assembly are urged into engagement, at least one of the slide members is received in a tooth gap of the toothed member, thereby positionally fixing the toothed member and the slide assembly relative to each other, to enable the transfer of power and/or torque from the drive part to the driven part. The remaining slide members are urged to their retracted positions.

The number of teeth in the toothed member is not equal to (and is preferably smaller than) the number of slide members in the slide assembly. Preferably, the number of teeth is evenly divisible by the difference between the number of slide members and the number of teeth. The gap or space between adjacent teeth has a width, at the ends of the teeth, greater than the width of the slide members. Additionally, the side surfaces of the teeth can be shaped to correspond generally to the shape of the slide members.

The slide assembly can be formed such that the slide members move either axially or radially.

In the slide assembly in which the slide members move axially, the slide assembly comprises a base and a wall extending from an end surface of the base. The wall is narrower than the base, and the base and wall in combination define a shoulder where they intersect. A plurality of channels are formed in the wall and extend into the base. The channel comprises a pocket which extends into the base from the shoulder, and a groove in the wall above the pocket. A slide member (such as a roller) and a resilient member (such as a coiled spring) are received in each channel pocket. The slide member is slidable axially in the channel pocket. A stop, preferably in the form of a snap ring, extends around the slide assembly wall above the slide members. The snap ring is positioned to prevent the slide members from fully exiting the pockets to maintain the slide members in the slide assembly pockets. The spring member urges the slide member axially toward the snap ring.

In one version of the clutch with axially moving slide members, the teeth are formed on an exterior surface of the toothed member. In this instance, the slide assembly base and wall share a common outer surface. The slide assembly base and wall define a ring, and the shoulder extends radially inwardly from the inner surface of the ring. Hence, the channels (with associated pockets and grooves), and slide members are all positioned along an inner surface of the slide assembly ring.

In a second version of the clutch with axially moving slide members, the toothed member is annular in shape and has an inner surface from which the teeth extend. In this embodiment, the toothed surface is the inner surface of the toothed member. The slide assembly base and wall, in this instance, share a common inner surface (or are cylindrical in shape); the channels are formed on an exterior surface of the slide assembly wall; and the shoulder extends radially outwardly from the wall. Hence, the channels (with associated pockets and grooves), and slide members are all positioned along an outer surface of the slide assembly.

In a third version of the clutch with axially movable slide members, the toothed member is in the shape of a ring and has both an inner surface and an outer surface, with teeth extending from both the inner and outer surfaces. The clutch includes an outer slide assembly which is engageable with the outer teeth and an inner slide assembly which is engageable with the inner teeth. The outer slide assembly is identical to the slide assembly described above in the first version, and the inner slide assembly is identical to the slide assembly described above in the second version. In this third version, a single drive part can drive two driven parts, either individually or simultaneously. Alternatively, two different drive parts can individually drive a single driven part.

In the second embodiment of the clutch, the slide members move radially, rather than axially. This clutch also includes a toothed member and a slide assembly which are moveable between a first position in which the two members are engaged with each other to transmit power and/or torque and a second position in which they are disengaged from each other to prevent the transmission of power and/or torque.

The toothed member comprises a surface which is generally circular in plan and a plurality of teeth extending from the surface. The slide assembly member comprises a body having a circumferential surface which is generally circular in plan and a has plurality of axially extending channels formed in the circumferential surface. The channels have a radial opening and a stop. A slide member and a resilient member are received in each of the channels. The slide member includes a tooth engaging portion which is sized and shaped to extend through the radial opening of the channel and a shoulder which engages the stop. The slide member is movable between an extended position in which the tooth engaging portion extends through the opening and a retracted position. The resilient member biases the slide member to its extended position.

In the illustrative embodiment, the channels extend between the front and back surfaces of the slide assembly body to be opened at their axial ends. To close the axial ends of the channels, the slide assembly includes a front cover plate and a back cover plate. The cover plates are sized to close the open axial ends of the channels and have axial extending lips which extend over a portion of the radial opening of the channel such that the radial opening has a length shorter than the channel. The lips of the cover plate form the stops which retain the slide member in the channel.

The slide member itself has a base portion having a length greater than the length of the radial opening. The tooth engaging portion of the slide member is shorter than the base and sized to extend through the radial opening. The tooth engaging portion and the base define a shoulder which engages the stop.

As with the first embodiment having axial movable slide members, when the slide assembly and the toothed member of this embodiment are engaged, at least one of the slide members will be received in a gap between the teeth of the toothed member. The slide members that are not received in a tooth gap, will be urged by the teeth of the toothed member to their retracted positions.

Like the clutch with axial movable slide members, the clutch with radial movable slide members can be constructed such that the teeth of the toothed member are on inner or outer surfaces of the toothed member. In such cases, the radial movable slide members will extend from circumferential outer or inner surfaces, respectively, of the body of the slide assembly. Additionally, the clutch tooth member can be annular in shape and have both inner and outer teeth, to be matable with an inner and an outer slide assembly.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
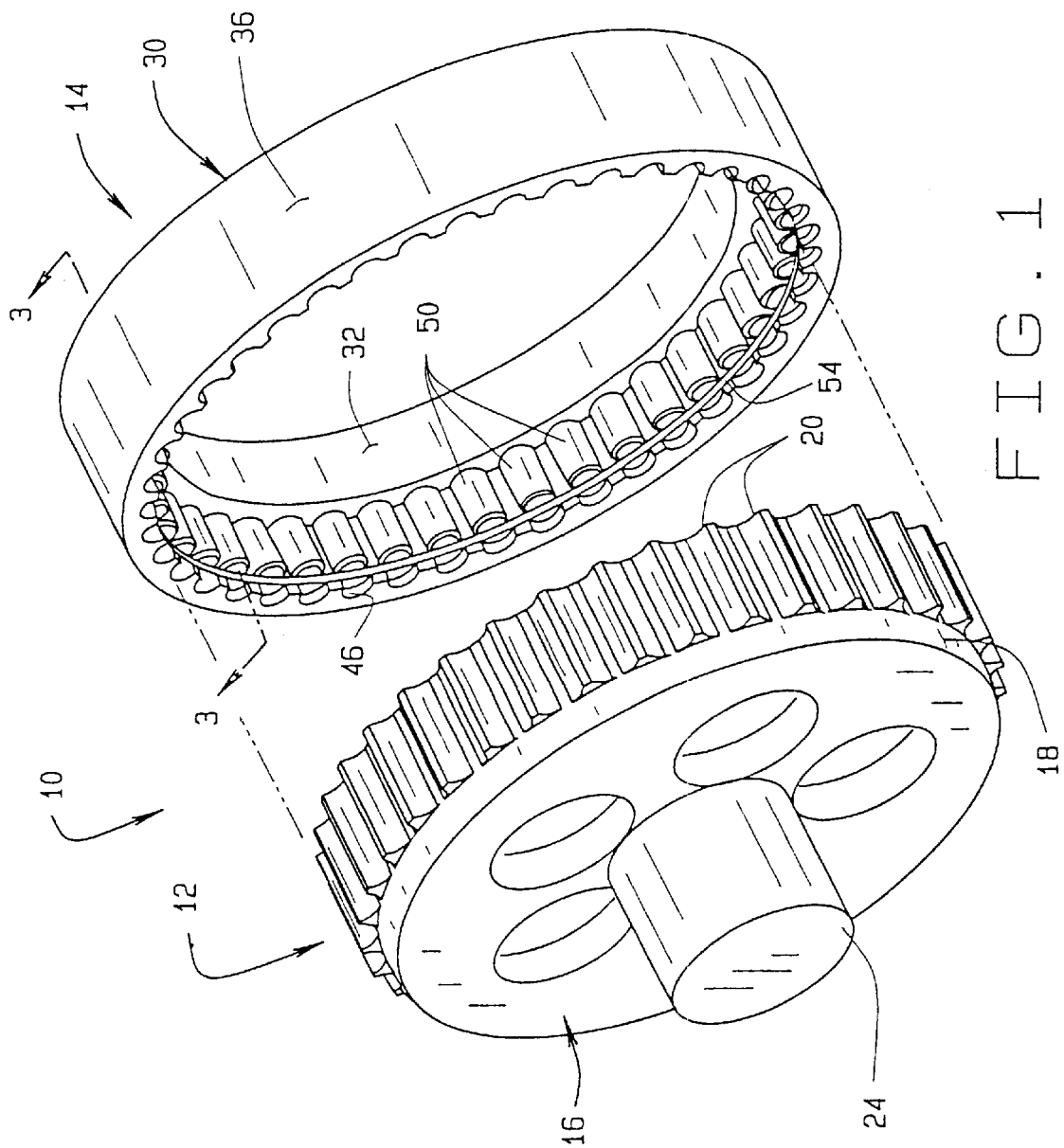
FIG. 1 is an exploded view of a first illustrative embodiment of a locking clutch of the present invention showing a toothed member and slide assembly of the locking clutch, the slide assembly including axially movable slide members.

The following detailed description illustrates the invention by way of example and not by way of limitation. This description will clearly enable one skilled in the art to make and use the invention, and describes several embodiments, adaptations, variations, alternatives and uses of the invention, including what I presently believe to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
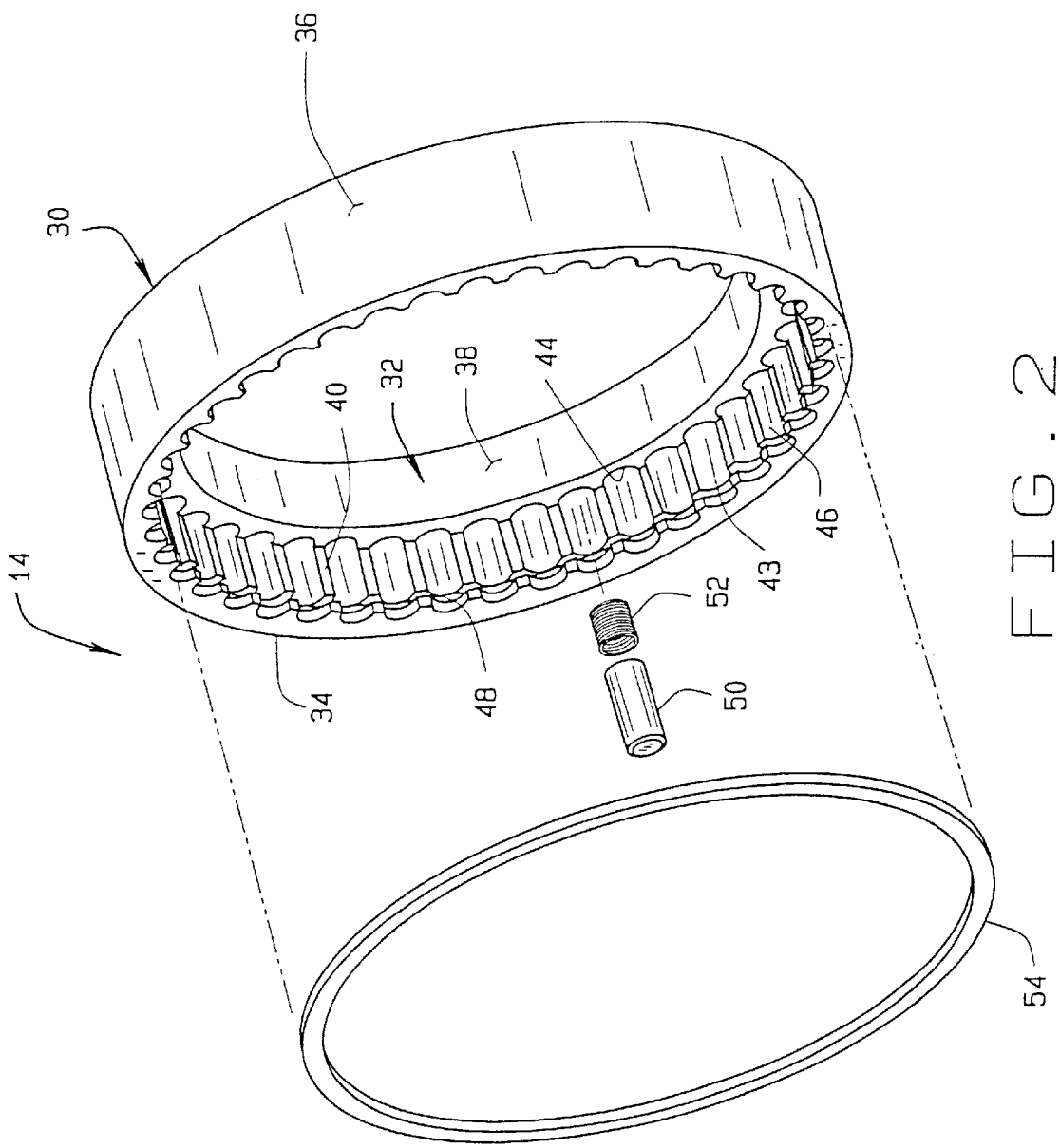
FIG. 2 is an exploded view of the slide assembly of FIG. 1.

An illustrative example of one locking clutch 10 of the present invention is shown generally in FIGS. 1 and 2. The locking clutch includes a toothed member 12 and a slide assembly 14 to which a drive and driven parts are operatively connected. As will be discussed below, the toothed member 12 and slide assembly 14 can be engaged to transmit torque and/or power from a drive part to a driven part, and disengaged to stop the transmission of power and/or torque from the drive part to the driven part. When assembled to the drive and driven parts, the toothed member 12 is preferably connected to the drive part and the slide assembly is preferably connected to the driven part. However, the toothed member 12 can be connected to the driven part and the slide assembly 14 can be connected to the drive part.

Figure 4:
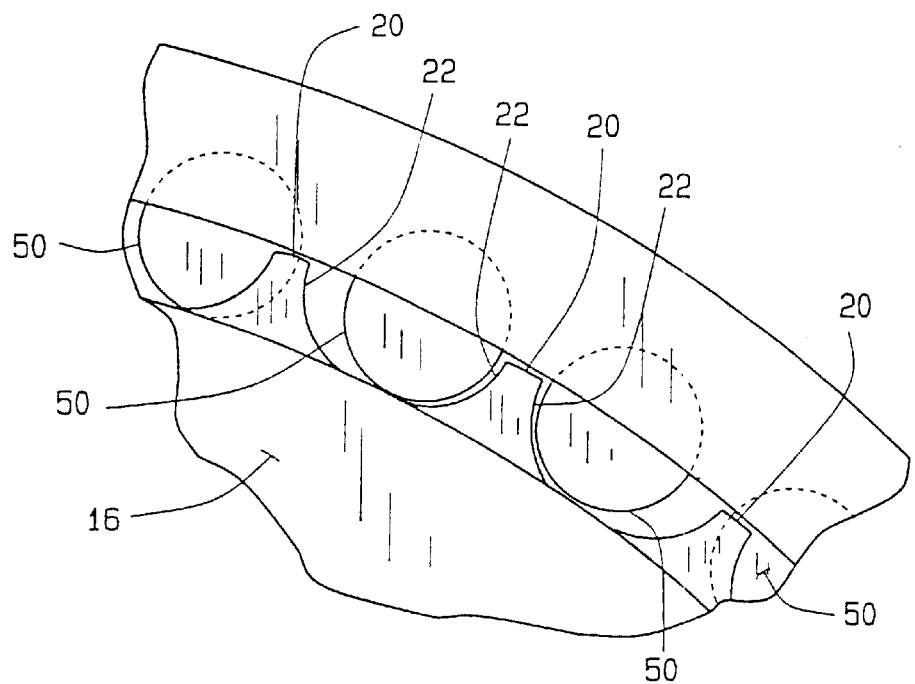
FIG. 4 shows the fit between adjacent slide members of the slide assembly with the teeth of the toothed member.

The toothed member 12 includes a plate or body 16 which is preferably circular in plan. The body 16 has a circumferential surface 18 with a plurality of teeth 20 having side surfaces 22 (FIG. 4). As seen, the tooth surfaces 22 define an arc. The teeth 20 are evenly and regularly spaced about the circumferential surface 18 of the body 16. A shaft 24 extends from the body 16. The shaft 24 allows for the toothed member 12 to be connected to the drive or driven part. The shaft 24 can be connected to the drive or driven part in any conventional manner. Although the toothed member body is shown as a plate or disc with a shaft, the toothed member could also simply be a shaft having the teeth 20 formed around its circumferential surface at the end of the shaft.

Figure 3:
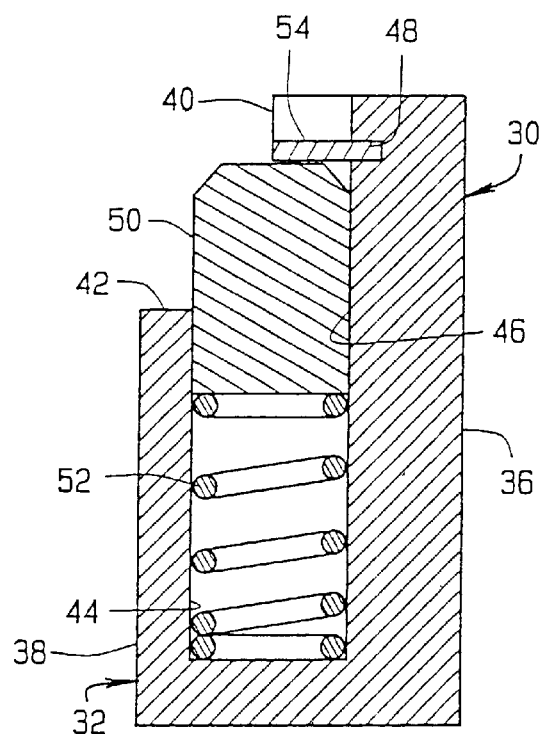
FIG. 3 is a cross-sectional view of the slide assembly taken along line 3—3 of FIG. 1

The slide assembly 14 includes a ring 30 having a base 32 and a wall 34 extending up from the base. The ring 30 has a single continuous outer surface 36 which forms an outer surface for both the base 32 and the wall 34. The base 32 and wall 34 also have inner surfaces 38 and 40, respectively. As seen in FIG. 2, the wall 34 is narrower than the base 32, and hence, a shoulder 42 is formed at the juncture of the wall 34 and base 32. A series of axially extending channels 43 (FIG. 2) are formed around the inner surfaces of the ring 30. The channels 43 are evenly and regularly spaced about the inner surfaces of the ring. The channels 43 effectively include two parts: a pocket 44 which extends axially from the top surface of the shoulder 42 into the ring base 32 and a groove 46 which extends from the top of the wall 34 to the shoulder 42. The pocket 46, and hence the channel 43, is closed at its bottom, as seen in FIG. 3, and has a mouth at the top of the pocket. As can be appreciated, the groove 46 has a surface which is effectively a continuation of the surface of the pocket. Hence, there is a smooth transition between the pockets 44 and their corresponding grooves 46, and the pocket and groove in combination form the channel 43. Additionally, the grooves 46 have a radial depth of about one-half the diameter of the pockets 44. The radial depth of the grooves 46 depends on the positioning of the pocket relative to the wall 34, and the grooves 46 could form an arc of more than or less than 180°. The pockets 44 are shown to be circular in plan, and the grooves 46 are shown to be semi-circular. A circumferential slit or groove 48 is formed in the inner surface 40 of the wall 34, near the top of the ring 30. A snap ring 54 is received in the circumferential groove 48.

The slide assembly 14 also includes a slide member 50 and a resilient member 52 which is received in each pocket 44. The resilient member 52 (which is preferably a coil spring) is received in the bottom of the pocket 44, and the slide member 50 is positioned in the pocket 44 and groove 46 above the spring. Hence, the spring 52 biases the slide member 50 axially, away from the base, and against the snap ring 54. The pocket 44 has a depth, such that when the spring 52 is compressed, the slide member 50 is substantially fully received in the pocket. Additionally, the snap ring 54 is positioned on the wall 34 such that the effective length of the groove 46 is less than the length of the slide member 50. Hence, the spring 52 cannot push the slide member 50 out of the pocket 44, and at least a portion of the slide member 50 will be received in the pocket when the slide member 50 is pushed against the snap ring 54. The slide member 50 is illustratively shown to be a roller. However, the slide member 50 could be any desired shape. As can be appreciated, the channels 43 are shaped complementarily to the slide members 50. Hence, if a differently shaped slide member is used, the shape of the channels would also change.

The slide assembly 14 is preferably operatively connected to the driven part; however, as noted above; it can alternatively be operatively connected to the drive part. As seen, the slide assembly 14 is annular or ring-shaped and includes a central opening. The drive or driven part can be force fit within this opening to be frictionally received within the ring base 32, or otherwise positionally fixed within the opening to operatively connect the drive or driven part to the slide assembly. Alternatively, the bottom of the slide assembly can be closed (i.e., so that there is no opening), and a shaft can extend from the bottom of the slide assembly to operatively connect the slide assembly 14 to the drive or driven part. The exterior surface 36 of the ring can be grooved or toothed to operatively connect the inner ring to the drive or driven part by gears, a chain, or a pulley. Of course, other mechanical means known to those skilled in the art can be employed to connect the slide assembly 14 to the drive or driven part.

The shape and width of the teeth 20 are designed such that the teeth can fit between any of two adjacent slide members 50, as seen in FIG. 4. Additionally, the distance between adjacent teeth 20 is greater than the diameter of the slide member 50. The number of teeth 20 on the plate 16 is chosen to be different from the number of slide members 50 in the slide assembly 14. When the two members (i.e., the toothed member 12 and the slide assembly 14) are pushed together for engagement, at least one, but not all, of the slide members 50 will be received between the teeth 20 of the toothed member. The slide members 50 in the slide assembly 14 that do not fall between two adjacent teeth will be pushed into the slide assembly channel pockets 44 or seats. The interaction of the teeth 20 with the slide members 50 that are received in the gap between the teeth 20, will rotationally fix the toothed member and slide assembly together. Hence, rotational movement of the toothed member will be transferred to the slide assembly.

Figure 5:
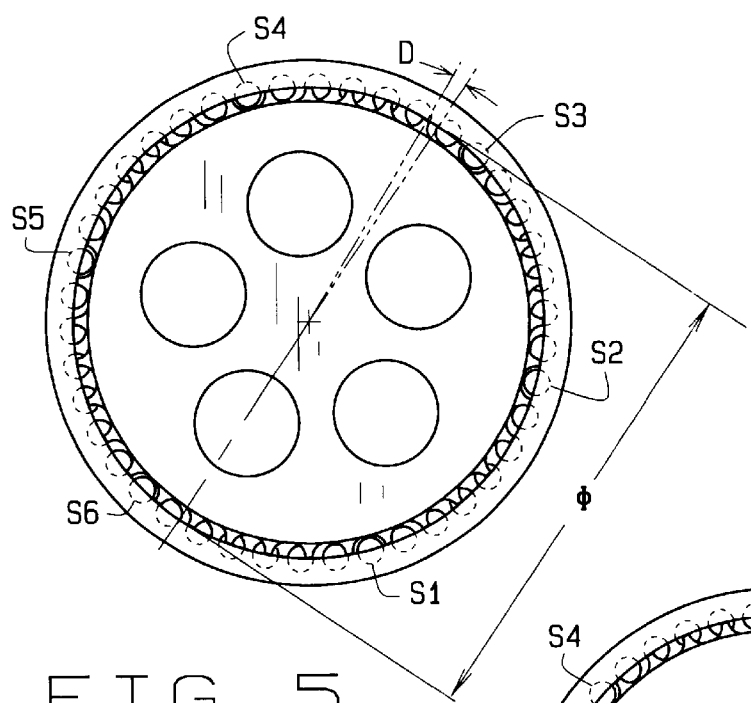
FIGS. 5–7 depict different angular alignments of the locking clutch of FIG. 1 about a common axis between the toothed member and the slide assembly.
Figure 6:
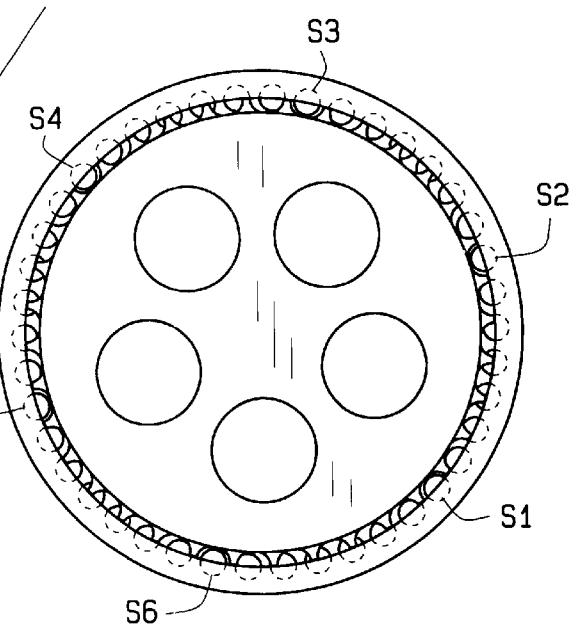
Figure 7:
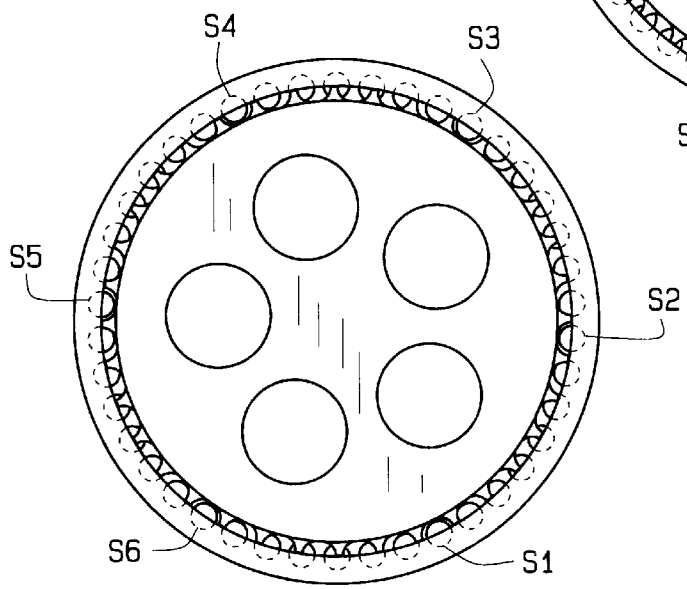

For any angular alignment of the two members 12 and 14, there will always be N number of slide members 50 that align between two adjacent teeth 20. These slide members will not be pushed into the slide assembly channel pockets upon engagement of the slide assembly and toothed member. Instead, they will engage with the teeth 20 to transmit torque and/or power from the drive part to the driven part. FIGS. 5–7 depict different angular alignments about a common axis between the toothed member 12 and the slide assembly 14. In each Figure, there are always six (6) slide members S1–S6 that fall between adjacent teeth.

To ensure the engagement under any angular alignment conditions, the gap (p) defined between adjacent teeth on the toothed member has to be equal to or wider than the combined width of the slide member ($w_s$) and the designated clearance ($\delta$). That is, $$p \geq w_s + \delta \quad (1A)$$

The designated clearance is calculated as $$\delta = \pi\phi \frac{|S-T|}{S \cdot T} \quad (1B)$$

where:
- $\phi$=pitch diameter (see FIG. 5);
- S=the number of sliding members;
- T=the number of toothed members; and
- |S−T| denotes the absolute value of the difference between the number of sliding members and the number of toothed members.

The number N of slide members that engage with the teeth is equal to the difference between the number of slide members (S) and the number of teeth (T). Hence, the number N of slide members that engage the teeth is given by the following equation:

$$N = S - T \quad (1C)$$

To ensure the engaging slide members evenly share the torque load, the number of teeth (T) is chosen to be evenly divisible by N. Stated differently, the modulus of T/N=0. Hence, T=qN, where q is a positive integer (i.e., $q \geq 1$).

The maximum angular clearance D (in radians) (FIG. 5) between a slide member and a tooth is shown by the following equations:

$$D = \frac{2\pi(S-T)}{S \cdot T} \text{ radians} \quad (2)$$

As noted below, $$q = \frac{T}{S-T}.$$

Hence, substituting q into equation 2, we arrive at $$D = \frac{2\pi}{S \cdot q} \leq \frac{2\pi}{S}.$$

As can be appreciated, the maximum angular clearance D is no greater than the angle between tow adjacent slide members $$\left(\frac{2\pi}{S}\right),$$

preferably, the maximum angular clearance being smaller than the angle between two adjacent slide members.

The maximum angular clearance D represents the worst case scenario that an initial relative angular movement could occur before torque and/or power is transferred between the drive and driven parts. For most cases, the initial angular movement between two engaging members will be smaller than the value D given by equation (2). As can be seen, from the equation (2), increasing the number of teeth (T) can effectively reduce the maximum possible clearance between a slide member and tooth, and thus increase the smoothness for torque and/or power transmission.

In the figures, the toothed member 12 has thirty-six (36) teeth, and the slide member assembly has forty-two (42) slide members. Hence, per equation (1), there are 42−36 or six (6) slide members S1–S6 that engage the teeth when the two members are engaged.

In accordance with Equation (2), the maximum angular clearance D is:

$$D = \frac{2\pi(42-36)}{42 \times 36} = 0.025 \text{ radian (or about } 1.43°)$$

In operation, the toothed member 12 and the slide assembly 14 are operatively connected to drive and driven parts, respectively. When the two members are not engaged, no power or torque is transmitted from the drive to the driven part. As the two members are brought together, N number of tooth gaps will align with N number of slide members. The remaining slide members will be pushed to a retracted position in their channels 43 as the axial ends of the teeth push the slide members into their respective channel pockets 44. The extent to which the slide members are pushed into their pockets when pushed to their retracted positions depends upon the degree of engagement of the toothed member 12 and slide assembly 14. When the two members 12 and 14 are engaged, the slide members 50 will be held in the gap between the teeth, rotationally fixing the two members together. Hence, the drive part and driven part will be operatively connected via the clutch 10, and the drive part can transfer torque and/or power to the driven part.

As noted above, the surfaces 22 of the teeth 20 are curved, or define an arc. As seen in the figures, the arc or curvature of the tooth surfaces 22 is slightly greater than the curvature of the slide member 50. However, the slide members need not be circular in cross-section. Rather, the slide members 50 can have generally any desired shape. The teeth could even comprise flat (as opposed to curved) walls. The channels 43 of the slide assembly are preferably shaped to correspond to the shape of the slide members so that the slide members can smoothly slide axially in the channels. Additionally, the tooth surfaces 22 should correspond generally to the shape of the slide member (i.e., the tooth surfaces 22 should have the same basic shape as the slide members 50) to allow for efficient engagement between the slide members 50 and the teeth 20.

Figure 8:
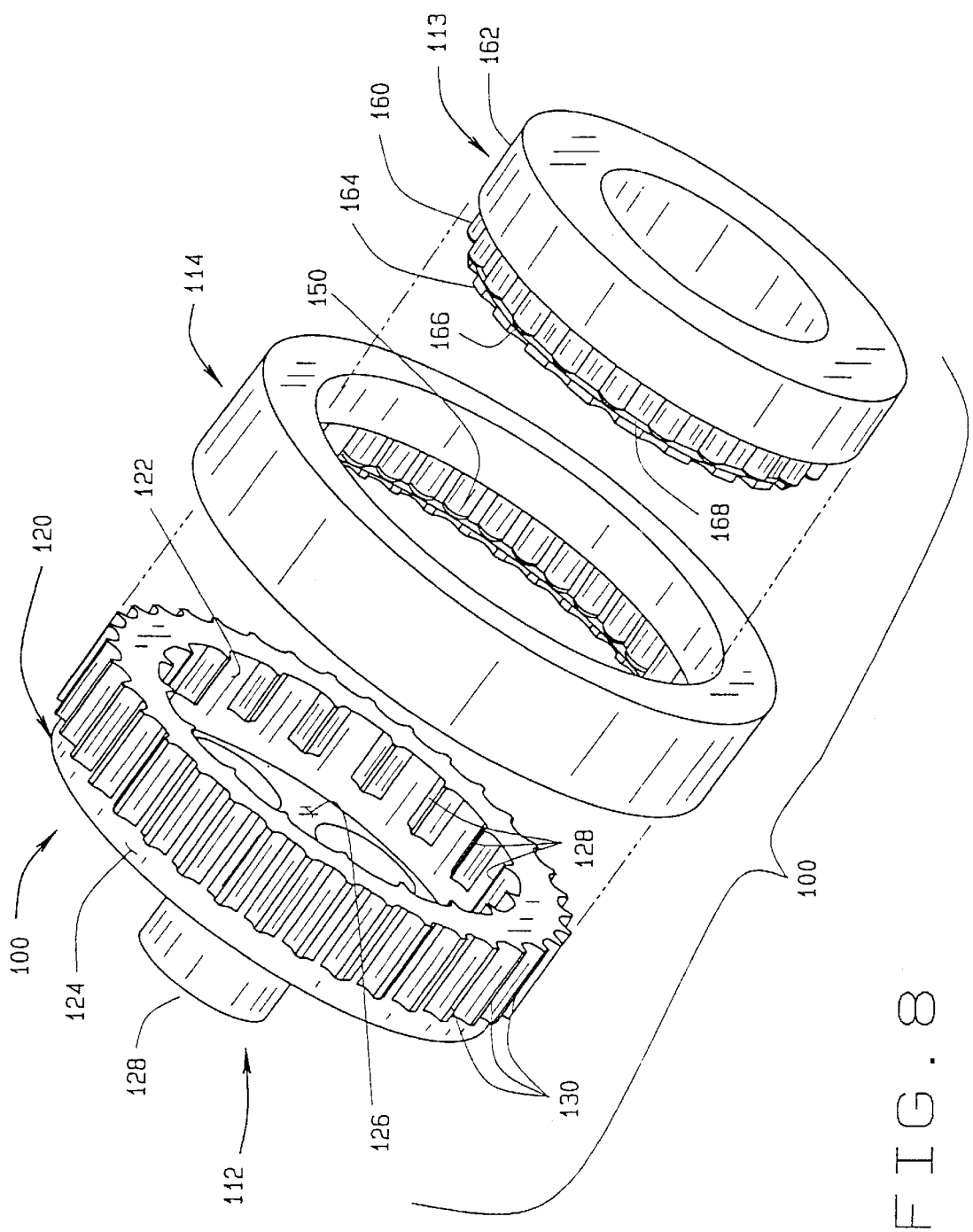
FIG. 8 is an exploded view of a variation of the locking clutch with axially movable slide members.

A variation of the locking clutch is shown in FIG. 8. The locking clutch 100 is similar to the locking clutch 10, however, rather than having a toothed member and one slide assembly, the clutch 100 includes a toothed member 120 and two slide assemblies—an inner slide assembly 113 and an outer slide assembly 114.

The toothed member 112 has a ring 120 at its end having an inner surface 122 and an outer surface 124. A plate or end wall 126 is at one end of the ring 120, and a shaft 128 extends from the plate 126 to connect the member 112 to a drive part. A plurality of inner teeth 128 are formed on the inner surface 122; and a plurality of outer teeth 130 are formed on the outer surface 124. The teeth 128 and 130 are generally similar in shape to each other, and to the teeth 20 of the clutch 10, inasmuch as the teeth have side surfaces which, as shown, are arcuate. However, as noted above, the shape of the teeth 128 and 130 need not be the same as the shape of teeth 20. In fact, the teeth 128 do not have to have the same shape as the teeth 130. Further, the number of inner teeth 128 and the number of outer teeth 130 need not be the same. The teeth 128 and 130 are evenly and regularly spaced about their respective surfaces. The toothed member 112 could also be formed from a shaft having a cup formed at its end. This cup would then have a toothed outer surface and a toothed inner surface.

The outer slide assembly 114 is identical to the slide assembly 14 of the clutch 10, and is not described herein. When the outer slide assembly 114 is engaged with the toothed member 112, at least one of the slide members 150 of the outer slide assembly are received in at least one of the gaps between the outer teeth 130 of the toothed member. The engagement of the outer slide assembly with the outer teeth 130 of the toothed member is identical to the engagement of the slide members 50 of the slide assembly 14 with the teeth 20 of the toothed member 12, as described above.

The inner slide assembly 113 is generally similar in construction to the outer slide assembly 114. However, rather than having slide members in channels on the interior of the slide assembly, the slide assembly 113 has slide members 160 received in channels on the exterior surface of the slide assembly 113. The manner in which the exterior surface of the inner slide assembly is formed is substantially similar to the manner in which the interior surface of the outer slide assembly 114 (or the slide assembly 14) is formed. That is, the slide assembly 113 has a base 162 from which a wall 164 extends to define an outer shoulder. The channels, like the channels 43, include pockets (not shown) which are formed in the outer shoulder, and which open into grooves 166 in the wall. Springs (not shown) and the slide members 160 are received in the pockets and held in place in the slide assembly 113 by a snap ring 168 which surrounds the wall 164.

When the inner slide assembly 113 is engaged with the toothed member 112, some of the slide members 160 of the inner slide assembly are received in the gaps between inner teeth 128 of the toothed member 112. The engagement of the inner slide assembly 113 with the inner teeth 128 of the toothed member is identical to the engagement of the slide members 50 of the slide assembly 14 with the teeth 20 of the toothed member 12, as described above.

The clutch 100 allows for one or both of the ring assemblies 113 and 114 to be engaged with the toothed member 112 at any one time. Hence, two driven parts can be driven by a single drive part. Thus, the clutch has four modes or operating positions: (1) neither slide assembly is engaged with the toothed member 112, thus preventing any transmission of torque and/or power from the drive part to either driven part; (2) only the inner slide assembly 113 is engaged with the toothed member 112 so that torque and/or power is transmitted only to a first of the driven parts; (3) only the outer slide assembly 114 is engaged with the toothed member 112 so that torque and/or power is transmitted only to a second of the driven parts; or (4) both slide assemblies are engaged with the toothed member 112, so that torque and/or power is transmitted to both of the driven parts.

As can be appreciated, the inner slide assembly 113 can be connected to a first driven member; and the outer slide assembly 114 can be connected to a second driven member. For example, the inner slide assembly 113 is shown to be annular and has a central opening. The first driven part can be force fit within this opening, or otherwise permanently fixed within the opening. Alternatively, the bottom of the inner slide assembly can be closed (i.e., so that there is no opening), and a shaft can extend from the bottom of the inner slide assembly to operatively connect the inner slide assembly 114 to the first driven part. Further, the exterior surface of the inner ring base 162 can be grooved or toothed to operatively connect the inner ring to the drive part by gears or by a pulley.

The outer slide assembly can similarly have a toothed or grooved outer surface to connect the outer slide assembly 114 to the second driven part by means of gearing, a chain, or a pulley. Other mechanical expedients known to those skilled in the art can also be used to connect the outer slide assembly 114 to the second drive part.

Figure 9:
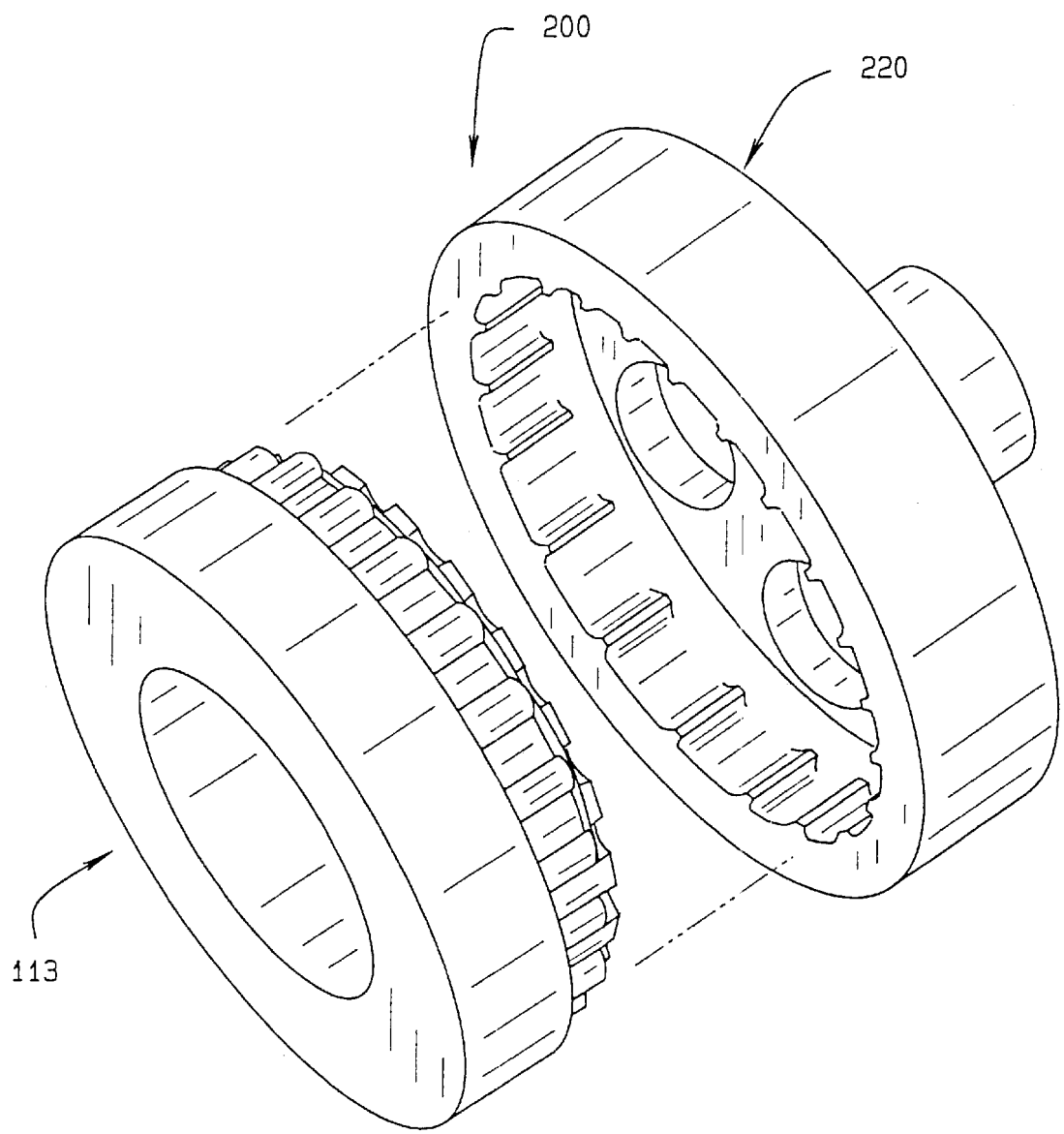
FIG. 9 is an exploded view of another variation of the locking clutch with axially movable slide members.

Another variation of the clutch with axially movable slide members is shown in FIG. 9. The clutch 200 of FIG. 9 includes the inner slide member 113 of FIG. 8. The toothed member 220 is substantially similar to the toothed member 120 of FIG. 8. However, the toothed member 220 has a smooth, rather than a toothed, outer surface. As can be appreciated, the clutch 200 is substantially the clutch 100, but without the outer slide member 114.

Although a coiled spring is shown to urge the slide members outwardly of their pockets to their extended position, the coiled spring could be replaced with any compressible, resilient member. The snap ring 54 act as a stops to prevent the slide members (or other tooth engaging members) from exiting their respective pockets. Other types of stops could be used as well. For example, a pin could extend radially through the slide members which is received in a closed groove in the pocket (i.e., the groove does not open into the slide assembly shoulder), or the slide member could be provided with a foot, and the pocket could have a shoulder near the top surface of the base which would engage the slide member foot. Both these modifications would require that the ring be formed as a two piece part—a main body with the pockets which are opened at the bottom to receive the slide member (or tooth engaging member) and a bottom cover to close the bottom of the body.

Figure 10:
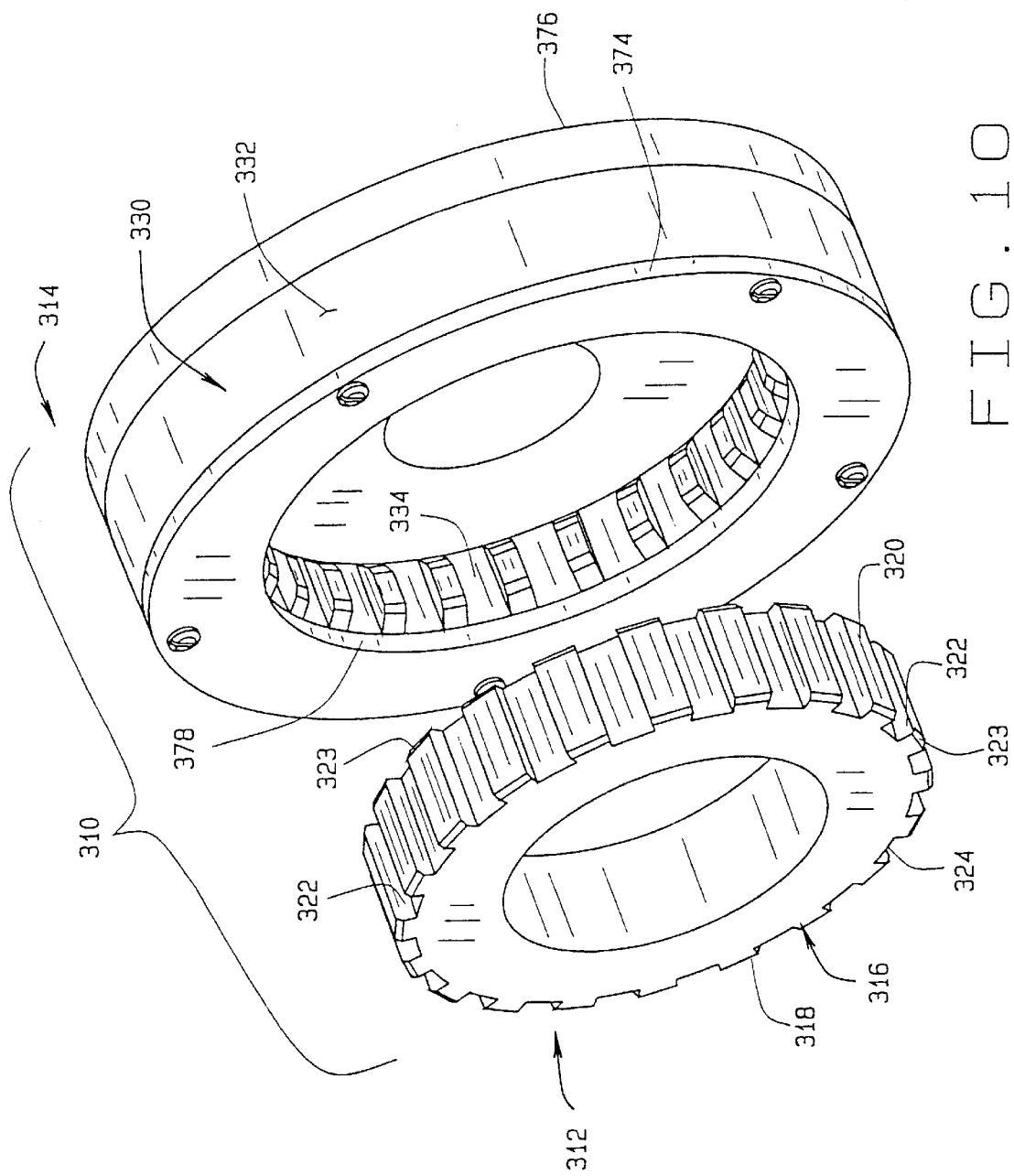
FIG. 10 is a perspective view of a first variation of a second embodiment of the locking clutch with radially, rather than axially, movable slide members.
Figure 11:
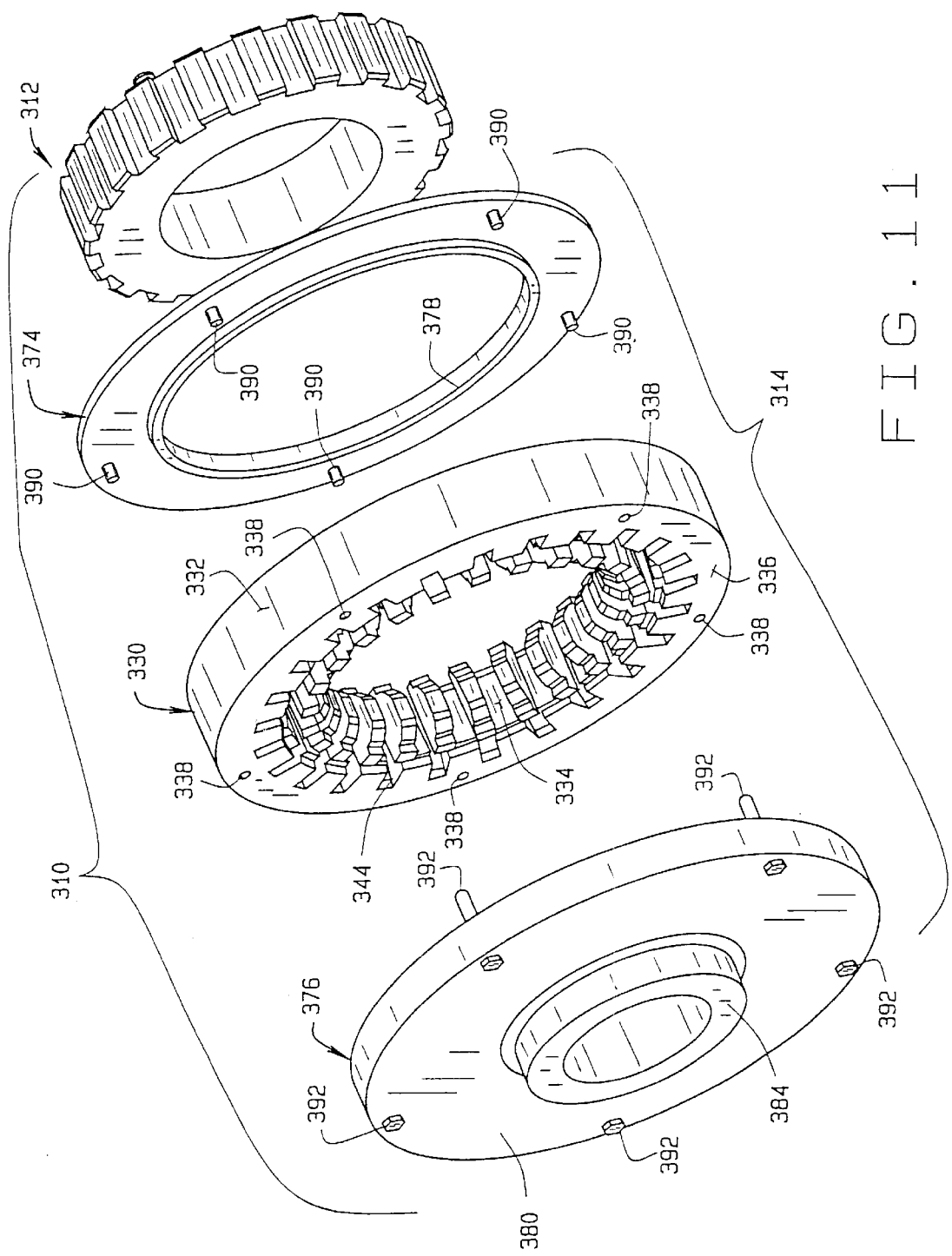
FIG. 11 is an exploded front perspective view of the locking clutch of FIG. 10.
Figure 12:
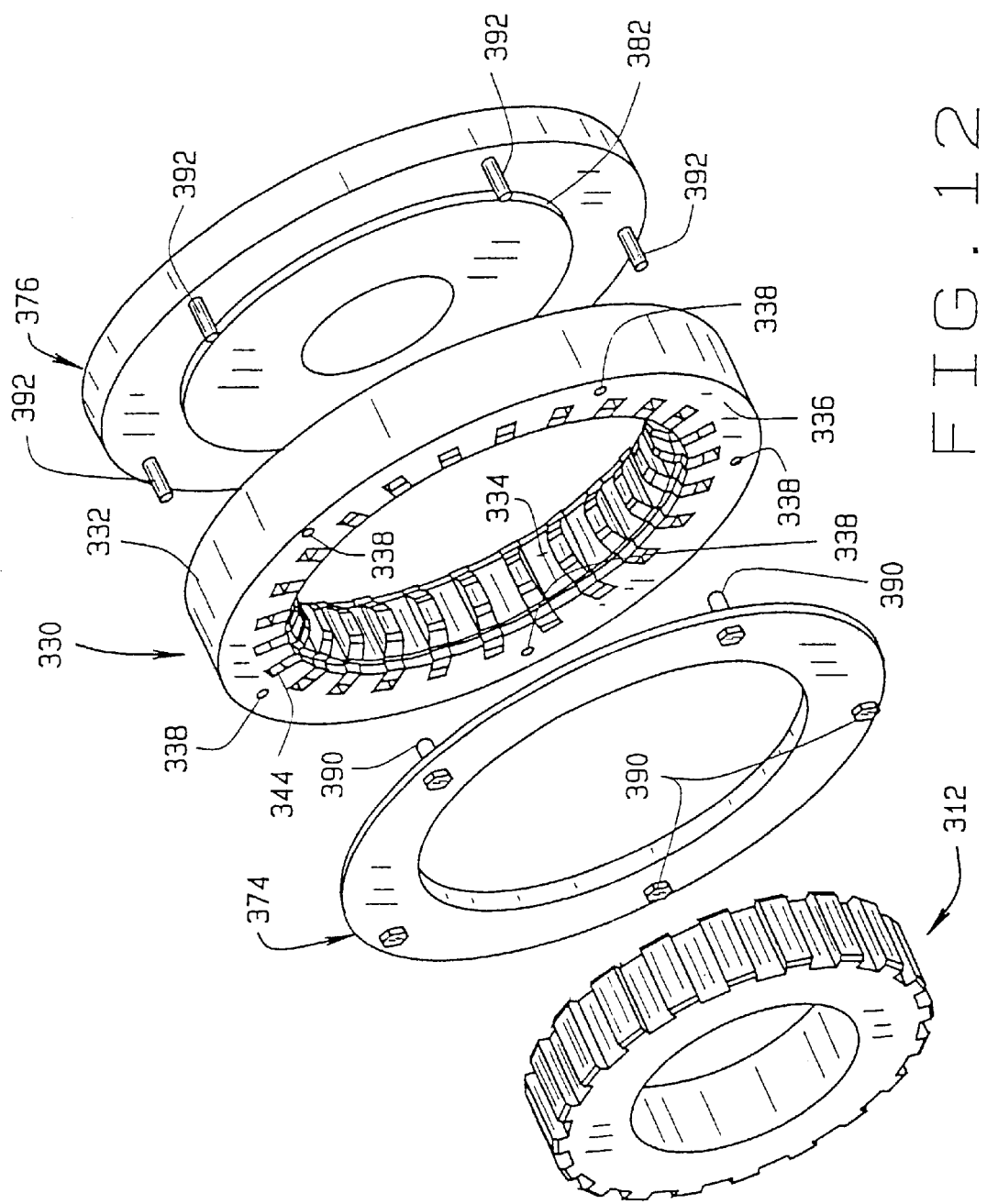
FIG. 12 is an exploded rear perspective view of the locking clutch of FIG. 10.

The locking clutches shown in FIGS. 1–9 all include axially movable slide members. The locking clutch can also be made with radially movable slide members. A first illustrative example of such a locking clutch is shown generally in FIGS. 10–12. The locking clutch 310 includes a toothed member 312 and a slide assembly 314 to which a drive and driven parts are operatively connected. The toothed member 312 and slide assembly 314 can be engaged to transmit torque and/or power from a drive part to a driven part, and disengaged to stop the transmission of power and/or torque from the drive part to the driven part. When assembled to the drive and driven parts, the toothed member 312 is preferably connected to the drive part and the slide assembly is preferably connected to the driven part. However, the toothed member 312 can be connected to the driven part and the slide assembly can be connected to the drive part.

The toothed member 312 includes a body 316 which is preferably circular in plan. The body 316 has a circumferential surface 318 with a plurality of teeth 320 having side surfaces 322. Preferably, the top and bottom edges of the teeth are chamfered, as at 323. The teeth surfaces 322 are shown to be generally flat, and extend generally radially from the body surface 318. However, as discussed above, the teeth surfaces can have other configurations to facilitate engagement of the teeth with the slide members. The teeth 320 are evenly and regularly spaced about the circumferential surface 318, and gaps or spaces 324 are defined by adjacent teeth 320. The toothed member 312 can be connected to a drive (or driven) part by any conventional means.

The slide assembly 314 (FIGS. 11–12) includes a ring 330 having an outer surface 332, an inner surface 334, and front and back surfaces 336. Passages 338 extend axially through the ring 330 from the front to the back surfaces of the ring. A plurality of radially opening channels 344 are formed in the ring inner surface 334. The channels 344 are evenly spaced apart around the ring inner surface 334. The channels 344 extend the full axial width of the ring, and hence are opened at their axial ends as well. It will be appreciated that the channels could be formed to be closed at the front and back surfaces of the ring, such that the channels would only open in a radial direction. Alternatively, the channels could be closed at one axial end, such that the channels open radially and are opened at the other axial end of the channel.

Figure 13:
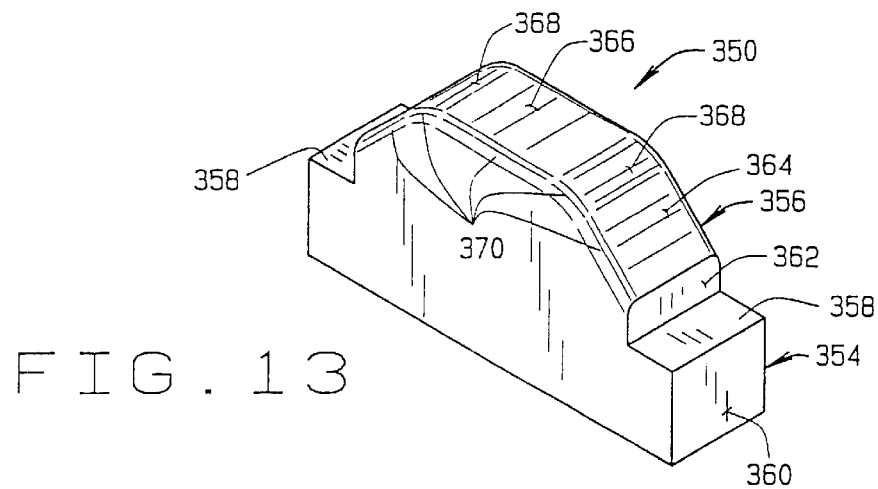
FIG. 13 is a perspective view of a slide member for use in the locking clutch of FIG. 10.

Each channel 344 receives a slide member 350 and a leaf spring 352. The slide member 350 (FIG. 13) includes a generally rectangularly-shaped base section 354 and a trapezoidal upper section 356. The trapezoidal upper section is shorter than the base, and hence, the base and upper sections define shoulders 358 which extend from the ends 360 of the base 354 to the ends 362 of the upper section 356. The upper section has end surfaces 362 which are generally perpendicular to the base shoulder 358, sloped surfaces 364 which extend from the end surfaces 362, and an upper surface 366 which extends between the sloped surfaces 364. Preferably, there is a curved transition area 368 between the sloped and upper surfaces of the upper section to avoid a sharp or angular junction between the surfaces. Additionally, the side edges of the sloped and upper surfaces and the transition areas are all chamfered, as at 370. The slide member 350 has a height (from the bottom of the base 354 to the upper section upper surface 366) which preferably is less than the radial depth of the channel 344 in the ring 330 such that the slide member preferably can be fully inserted into the channel 344. However, as will be appreciated, the respective sizes of the slide member 350 and the channel 344 need only be sufficient to allow the slide member to be retracted into the channel 344 to a depth where the slide member will not interfere with axial movement of the toothed member. The length of the slide member (from one end 360 of the base to the opposite end of the base) is slightly less than the axial length of the channel 344 such that the slide member can move radially in the channel. As will be described below, the channels 344 are closed at their axial ends to prevent substantial axial movement of the slide members 350.

Figure 14:
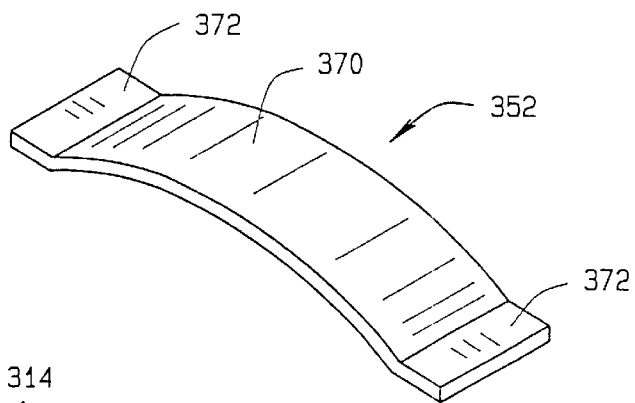
FIG. 14 is a perspective view of a leaf spring used to bias the slide member of FIG. 13 in the locking clutch of FIG. 10.

The leaf spring 352 (FIG. 14) has a central arched section 370 with a flat end sections 372 extending from opposite sides of the arched section 370. The leaf spring 352 is received in the channel 344 between the radial back wall of the channel and the slide member 350. The leaf spring biases the slide member 350 radially outwardly relative to the channel 344 to the slide member's extended position. As will be discussed below, in certain circumstances, the slide members will be retracted into the channels to a retracted position, in which case, the leaf springs will be compressed (and hence, the end sections 372 will move away from each other). Thus, the leaf springs have a length shorter than the axial length of the grooves 344 sufficient to accommodate the lengthening of the leaf springs as they are compressed. Although leaf springs are shown in the drawings, other types of springs or resilient materials can be used in place of the leaf springs. For example, one or more coiled springs could be used or a resilient, compressible material, such as a foam, could be used.

The ring 330 is covered on one side by a front cover plate 374 and on its opposite side by a back cover plate or shaft flange 376. The front cover plate 374 is annular in shape to cover the front face of the ring 330 and to close one axial end of the channel 344. The cover plate includes a rim or rib 378 which, as shown in FIG. 15, closes a portion of the radial opening of the ring channel 344.

The back cover plate 376 includes a pilot or shoulder 382 extending from the inner surface of the plate 376 and a connection shaft 384 extending from the outer surface of the plate 376. The plate 376 has a diameter sized to correspond to the diameter of the ring 330, and hence, closes an axial end of the channel. The pilot 382 closes a portion of the radial opening of the ring channel 344. Although shown as a stepped section of the back end plate, the pilot 382 could also be formed as a rib extending from the body 380. A driven (or drive) part can be connected to the connection shaft 384 in any conventional manner.

To secure the end plates 374 and 376 to the ring 330, the end plates 374 and 376 are both provided with fasteners 390 and 392 (FIG. 12), respectively which are received in the passages 338 in the ring. The passages 338 can be internally threaded, and the fasteners 390 and 392 can be screws or bolts which are threaded into the passages 338 of the slide assembly body 330. Alternatively, one of the fasteners can be a tube having an internally threaded end, and the other can be a bolt or screw which is threaded into the threaded end of the tube. In an other alternative, the cover plate and shaft flange can simply be welded to the ring. However, this would prevent disassembly of the slide assembly 314 for purposes such as repair and replacement of various elements of the slide assembly.

Figure 15:
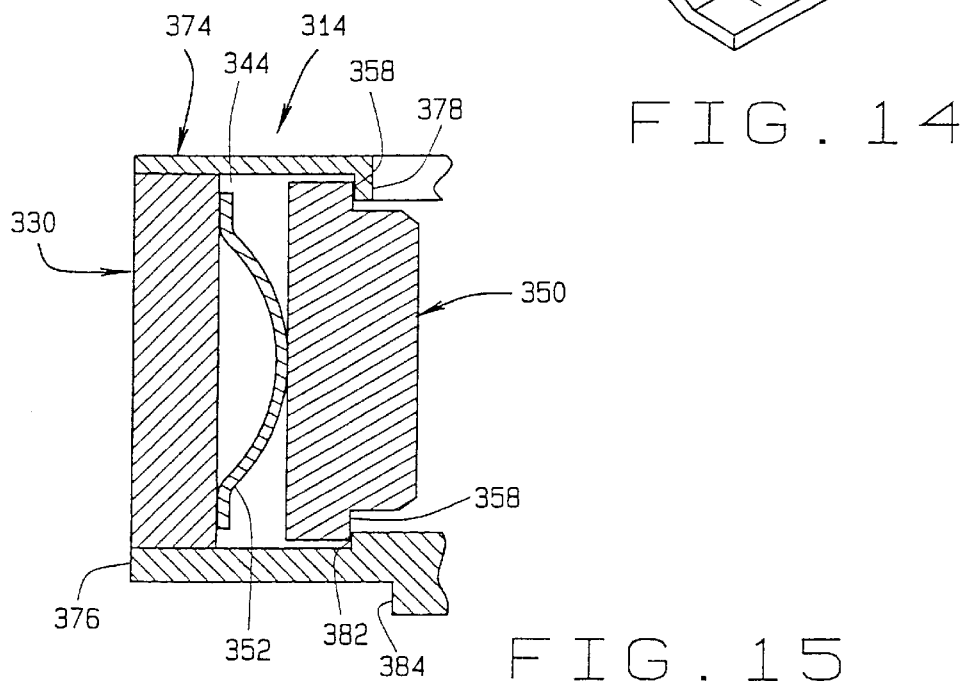
FIG. 15 is a cross-sectional view of the slide assembly of the locking clutch of FIG. 10.

As can be seen in FIG. 15, the plates 374 and 376 close the axial ends of the channel 344 and close a portion of the radial opening of the channels 344. The rib 378 and pilot 382 are sized such that the slide member shoulders 358 will engage the plate rib 378 and pilot 382 to prevent the slide members 350 from radially exiting the channels 344. Additionally, the end plates 374 and 376, by closing the axial ends of the channels 344, prevent substantial axial movement of the slide members 350.

The spring 352 normally biases the slide member 350 radially inwardly relative to the ring 330 such that the shoulders 358 are urged against the cover plate rib 378 and the shaft flange pilot 382. Hence, the cover plate 374 and the shaft flange 376 act as stops and serve to retain the spring 352 and slide member 350 in the ring channel 344. Looked at differently, the cover plate 374, shaft flange 376, and the ring channel 344 cooperate to define a channel closed at its axial ends and having a radial opening in which the slide member 350 is retained. In this normal position, as seen in FIG. 15, the slide member upper portion 356 extends beyond the opening to the channel 344.

Although a cover plate and a shaft flange are used to retain the slide members in the channels, other means and constructions could be used retain the slide members in the channels. For example, the channel 344 could have an axial length less than the axial width of the ring, such that the channel would be closed on opposite ends. This would avoid the need of the end plates to close the axial ends of the channels. The ring could then be provided with a lip or wall which extends beyond the inner surface of the ring. A groove could be provided in the lip, and a snap ring could be placed in the groove. The shoulders 358 of the slide member 350 would then be biased against the snap ring by the spring 352.

As with the clutches of FIGS. 1–9, the number of teeth 320 on the toothed member 312 is chosen to be different from the number of slide members 350 in the slide assembly 314. When the toothed member 312 and the slide assembly 314 are pushed axially together for engagement, at lest one of the slide members 350 will fall between two adjacent teeth 320 of the toothed member 312. The remaining slide members 350 will be engaged by the teeth 320 and will be moved radially to their retracted position in the channels 344. The tooth engaging portion or upper portion of the slide member 350 is trapezoidal, and has sloped edges 364. When the toothed member 312 and the slide member 314 are moved axially toward each other, the teeth 320 will engage the sloped edges 364 of the slide members that do not align with the gaps between the teeth. The axial movement of the teeth over the sloped surface of the slide member will cause the slide member to retract radially into the channel to their retracted positions where they will not interfere with the axial movement of the toothed member relative to the slide assembly.

Figure 16:
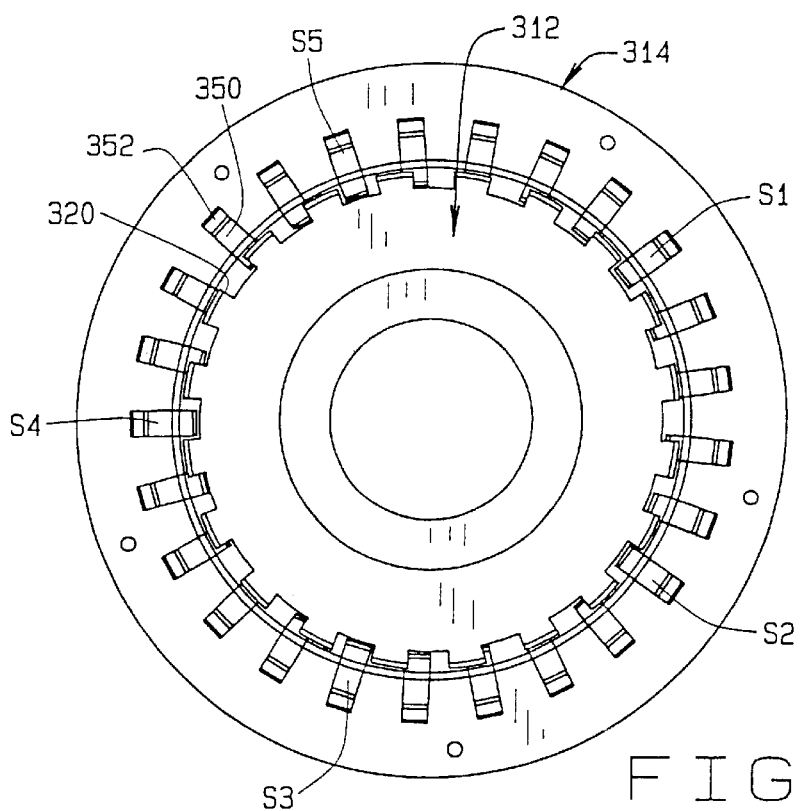
FIG. 16 depicts an arbitrary angular alignment about a common axis of the locking clutch of FIG. 10 showing the engagement of the slide members with the teeth of the toothed member.

For any angular alignment of the two members (312 and 314), there will always be at least N number of slide members 350 that align between two adjacent teeth 320 on the toothed member 312. These slide members will not be pushed to their respective retracted positions. Instead, they will be received in the gap between the teeth to engage with the teeth 320 to transmit torque and/or power. FIG. 16 depicts an arbitrary angular alignment about a common axis of the toothed member 312 and the slide assembly 314. In this figure, there are 5 slide members (S1–S5) that fall between adjacent teeth 320. As with the clutch 10, the number of slide members 350 that engage with the teeth 320 equals to the difference between the number of slide members and the number of teeth. Hence, the number N of slide members 350 engaged with the teeth 320 is determined according to Equation (1) above.

Similarly, the maximum possible angular clearance between a slide member and a tooth is determined by Equation (2) above. The maximum possible angular clearance represents the worst scenario that an initial relative angular movement could occur before torque and/or power is transferred between the drive and driven components. For most cases, the initial angular movement between to two engaging members will be smaller than the value D given by Equation (2).

As can be seen from Equation (2), increasing the number of teeth can effectively reduce the maximum possible clearance between a slide member and a tooth, and thus increase the smoothness for torque and/or power transmission.

To ensure the engaging slide members 350 equally share the load, the number of teeth 320 on the toothed member 312 is chosen to be equally divisible by the difference between the number of slide members 350 of the slide assembly 314 and the number of teeth 320 on the toothed member 312. That is to say:

$$\frac{T}{S-T} \text{ is a positive integer } (q).$$

is a positive integer (g).

Figure 17:
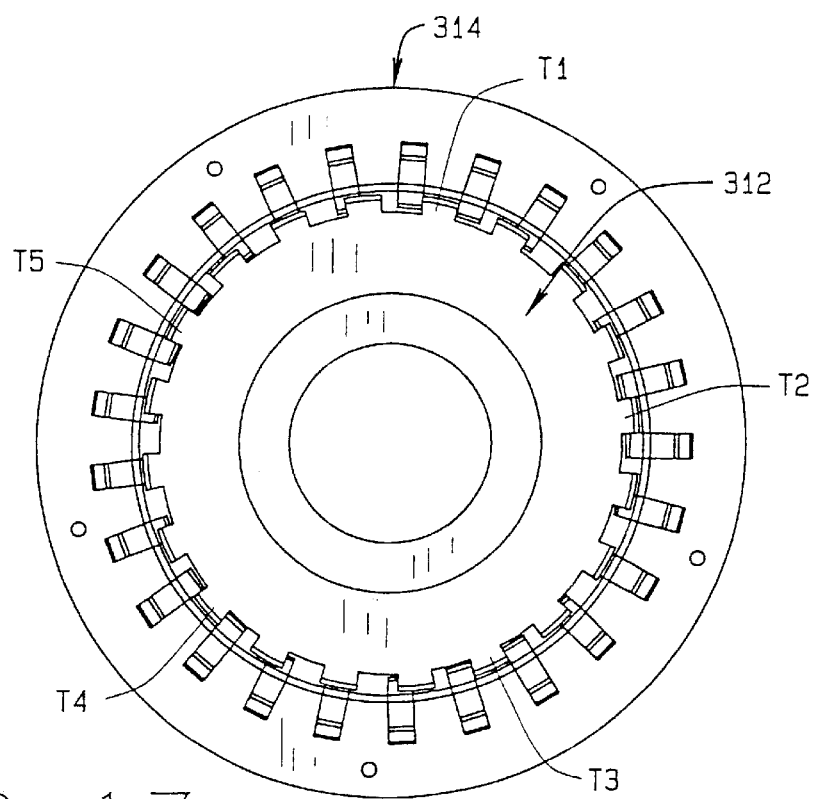
FIG. 17 depicts the situation wherein teeth of the toothed member are locked between two adjacent slide members.

The width of the teeth 320 on the toothed member 312 is equal to, or slightly less than, the gap between two adjacent slide members 350 in the slide assembly 314. Thus, once the engagement is established and the possible angular clearance is removed, the engaging tooth/teeth 320 is/are firmly locked between two respective slide members 350. There is literally no backlash between the toothed member 312 and the slide assembly 314. FIG. 17 shows the situation where five (5) engaging teeth (T1–T5) are locked respectively between two adjacent slide members.

Figure 18:
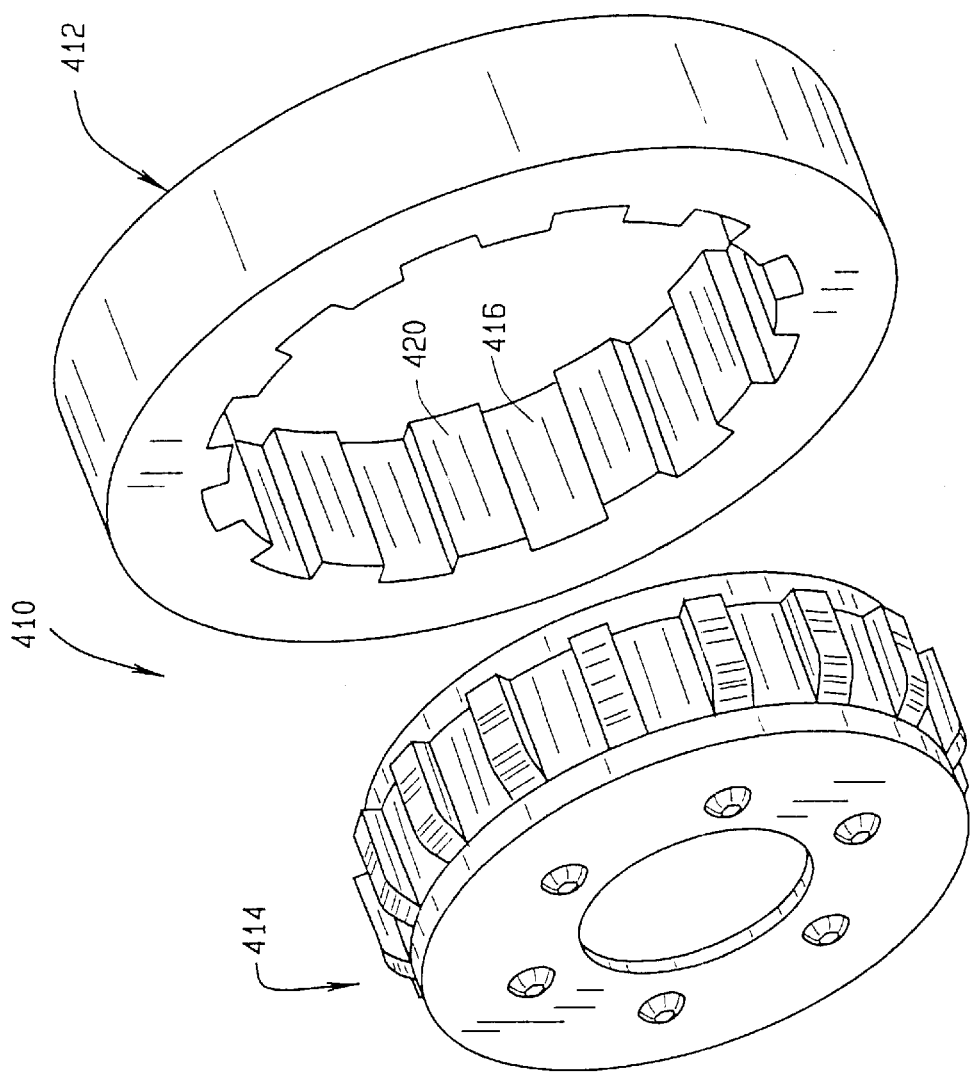
FIG. 18 shows a second variation of the locking clutch with radially movable slide members.
Figure 19:
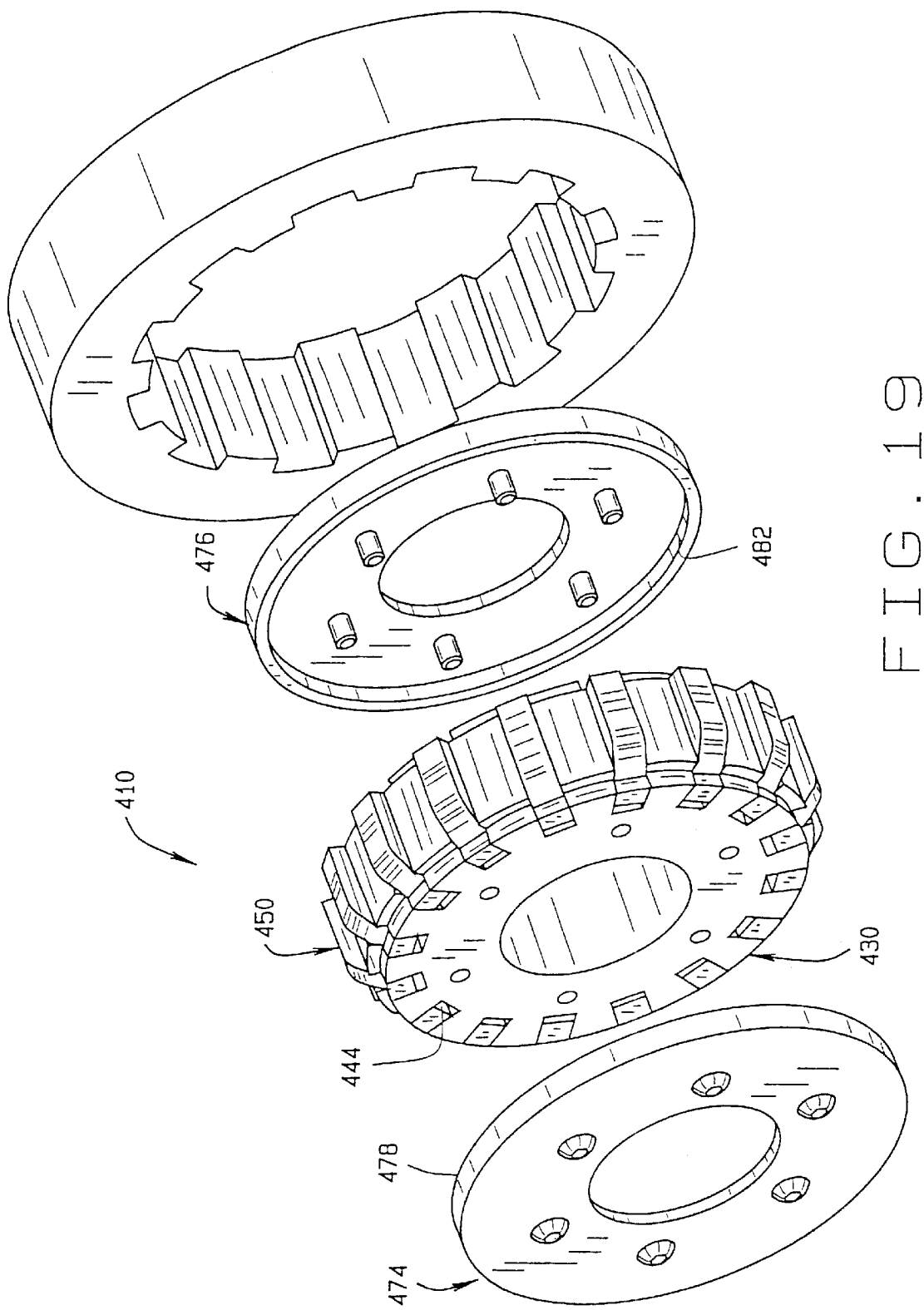
FIG. 19 is an exploded perspective view of the locking clutch of FIG. 18.

A second variation of the locking clutch with radially moving slide members is shown in FIGS. 18–19. This variation is analogous to the locking clutch with axial moving slide members shown in FIG. 9; that is, in this variation, the slide members extend radially outwardly from the slide assembly body, rather than radially inwardly, and the teeth of the toothed member extend radially inwardly, rather than radially outwardly. The locking clutch 410 includes a toothed member 412 and a slide assembly 414. The toothed member 412 is in the shape of a ring having a inner surface 416 from which teeth 420 extend radially inwardly. The teeth 420 are evenly spaced about the inner surface 416 of the toothed member 412.

The inner slide assembly 414 includes a body 430 having an outer surface with a plurality of axially extending channels 444 formed therein. A slide member 450 and a spring (not shown) is received in each channel 444. The slide members 450 and springs are held in the respective channels 444 by a front cover plate 474 and a back cover plate 476. The slide members 450 and springs are the same as used in the locking clutch 310, and are not further described herein. The cover plates 474 and 476 each have outer ribs 478 and 482, respectively, which close a portion of the radial opening into the channels 444. For each channel 444, there will be a spring and a slide member 450 assembled in it. The spring urges the slide member 450 radially outwardly. The slide members 450 are retained in channels 444 by the front and back cover plates 474 and 476.

The number of teeth 420 in the toothed member 412 is different from the number of slide members 450 in the inner slide assembly 414, in accordance with the discussion above. The locking clutch 410 is operated under the same principle as locking clutch 310.

A locking clutch having radially moving slide members and which includes two slide assemblies can also be formed similarly to the locking clutch 100 of FIG. 8. In this instance, the toothed member would define a ring having inner and outer surfaces, with teeth formed on both its inner and outer surfaces. The slide assembly 314 (FIGS. 10–12) would mate with the teeth on the outer surface of the toothed member and the slide assembly 414 (FIGS. 18–19) would mate with the teeth on the inner surface of the toothed member.

As various changes could be made in the above constructions without departing from the scope of the invention, it is intended that all matter contained in the above description or shown in the accompanying drawings shall be interpreted as illustrative and not in a limiting sense. The toothed member and the slide assemblies can be operatively connected to their respective drive and driven parts in any conventional manner. These examples are merely illustrative.

What is claimed is:

1. A locking clutch comprising:

a toothed member; the toothed member comprising a cylindrical surface and a plurality of teeth spaced about and extending from said cylindrical surface and defining a tooth gap between adjacent teeth; and a slide assembly; the slide assembly comprising a body having a cylindrical surface, said surface having a plurality of channels formed therein; a slide member in each of said channels, said slide member being movable relative to said channel between an extended position and a retracted position; a resilient member in each of said channels to bias said slide member to its extended position; and a stop positioned in said channel to prevent said slide member from fully exiting said channel;

said toothed member surface and said slide assembly surface being positioned such that when said toothed member and said slide assembly are urged into engagement, at least one of said slide members is received in a tooth gap (p) of said toothed member; and the remaining of said slide members are moved to their retracted positions; wherein p is defined as follows:

$$p \geq w_s + \delta;$$

where $w_s$ = the width of the slide member; and $$\delta = \pi \phi \frac{|S-T|}{S \cdot T}; \text{ where:}$$

$\phi$ = tooth pitch diameter;
S = the number of sliding members;
T = the number of toothed members; and
|S−T| denotes the absolute value of the difference between the number of sliding members and the number of toothed members.

2. The locking clutch of claim 1 wherein the width of the teeth on the toothed member is equal to or slightly less than the width of the gap between two adjacent sliding members.

3. The locking clutch of claim 1 wherein said slide members move axially relative to said slide assembly; said slide assembly body comprising a base and a wall extending from an end surface of said base; said base and wall defining a shoulder; said channels each including a pocket extending axially into said base from said shoulder; said pocket having an axial opening; said slide members and resilient members being received in said axially extending pockets; said slide member extending from said pocket opening.

4. The locking clutch of claim 1 wherein said slide members are moveable radially relative to said slide assembly; said channels extending axially and said channels having radial openings through which said slide members extend.

5. The locking clutch of claim 1 wherein the number of teeth is not equal to the number of slide members.

6. The locking clutch of claim 5 wherein the number of teeth is smaller than the number of slide members; and, wherein the number of teeth is evenly divisible by the difference between the number of slide members and the number of teeth.

7. The locking clutch of claim 1 wherein said teeth extend from an exterior surface of said tooth member; said slide assembly body surface being an inner surface; said channels being formed on said inner surface.

8. The locking clutch of claim 1 wherein said toothed member is, at least partially, annular in shape, having an inner surface and an outer surface; said toothed surface being said inner surface; said slide assembly channels being on an exterior surface of said slide assembly body.

9. A locking clutch comprising:
a toothed member; said toothed member being, at least partially, in the shape of a ring and has both an inner surface and an outer surface and comprising a plurality of outer teeth extending from said toothed member outer surface and a plurality of inner teeth extending inwardly from said toothed member inner surface;
an outer slide assembly; said outer slide assembly comprising a body having an inner surface and a plurality of channels formed on said inner surface; a slide member in each of said channels, said slide member being movable relative to said channel between an extended position and a retracted position; a resilient member in each of said channels to bias said slide member to its extended position; and a stop positioned in said channel to prevent said slide member from fully exiting said channel;
an inner slide assembly; said inner slide assembly comprising a body having an outer surface; a plurality of channels formed in outer surface; a slide member received in each said channel and moveable between an extended and a retracted position; and a resilient member in said channel which urges said slide members towards their extended positions;
said toothed member surfaces and said slide assembly surfaces being positioned such that when said toothed member and at least one of said slide assemblies are urged into engagement, at least one of said slide members is received in a tooth gap of said toothed member; and the remaining of said slide members are moved to their retracted positions.

10. A locking clutch comprising:
a toothed member; the toothed member comprising a cylindrical surface and a plurality of teeth spaced about and extending from said cylindrical surface; and
a slide assembly; the slide assembly comprising a base and a wall extending from an end surface of said base; said base and wall defining a shoulder; a plurality of pockets formed in said shoulder; a slide member received in said pocket; and a resilient member in said pocket which urges said slide member axially; said slide member being moveable between an extended position and a refracted position; said resilient member biasing said slide member to its extended position;
the teeth of said toothed member being spaced apart to define a gap between said teeth sized to receive said slide members; whereby, when said toothed member and said slide assembly are urged into engagement, at least one of said slide members is received in a tooth gap of said toothed member; and the remaining of said slide members are moved to their retracted positions;
there being an angular clearance D between a slide member and a tooth, the maximum angular clearance being determined by as follows:

$$D = \frac{2\pi(S-T)}{S \cdot T} \text{ radians, where}$$

T = the number of teeth in the toothed member, and
S = the number of slide members in the slide assembly.

11. The locking clutch of claim 10 wherein said slide assembly further includes a plurality of grooves formed in said wall above said pockets; there being a groove for each pocket.

12. The locking clutch of claim 10 wherein the teeth have side surfaces; said teeth side surfaces defining a shape corresponding to the external shape of said slide members.

13. The locking clutch of claim 10 wherein said slide members are rollers and said teeth side surfaces are arcuate.

14. The locking clutch of claim 10 wherein said slide assembly further comprises a stop to prevent said slide member from fully exiting said pocket.

15. The locking clutch of claim 14 wherein said stop comprises a ring extending around said wall; said ring being spaced from an upper surface of said base a distance less than the length of said slide members.

16. The locking clutch of claim 10 wherein said gap between said teeth has a width, at the ends of said teeth, greater than the width of said slide members.

17. A locking clutch comprising:
a toothed member; the toothed member comprising an outer cylindrical surface and a plurality of teeth spaced about and extending from said outer cylindrical surface; and a slide assembly; the slide assembly comprising a body having an inner surface; a plurality of channels formed in said surface; a slide member received in each said channel moveable between a retracted position and an extended position; and a resilient member in each said channel which urges said slide members to their extended positions;

said slide assembly having more slide members than does the toothed member have teeth wherein the teeth of said toothed member being spaced apart to define a gap between adjacent teeth; said gap being sized to at least partially receive said slide members; whereby, when said toothed member and said slide assembly are urged into engagement, at least some of said slide members are received in said gaps to be in an operative position; and at least some of said slide members are urged to their retracted positions to be in an inoperative position.

18. The locking clutch of claim 17 wherein said slide assembly body comprises a wall extending from an end surface of said body; said body and wall each having an inner surface; said body inner surface being spaced radially inwardly from said wall inner surface to define a shoulder at a junction of said wall inner surface with an end surface of said body; said channel extending axially into said body from said shoulder.

19. The locking clutch of claim 17 wherein said channels extend radially outwardly from said body inner surface.

20. A clutch comprising:
a toothed member comprising an cylindrical inner surface and a cylindrical outer surface; a plurality of outer teeth spaced about and extending from said outer surface; and a plurality of inner teeth spaced about and extending from said inner surface;
an outer slide assembly; the outer slide assembly comprising a body having an inner surface; a plurality of channels formed in outer body inner surface; a slide member received in each channel moveable between an extended position and a retracted position; and a resilient member in each said channel which urges said slide members to their extended position; and a stop to prevent said slide members from fully exiting said channels; and
an inner slide assembly; the inner slide assembly comprising a body having an outer surface; a plurality of channels formed in inner body outer surface; a slide member received in each said channel moveable between an extended position and a retracted position; and a resilient member in each said channel which urges said slide member to its extended position; and a stop to prevent said slide members from fully exiting said channels;
the inner and outer teeth of said respective toothed members being spaced apart to define gaps between said inner teeth and gaps between said outer teeth; said gaps being sized to receive said slide members of said inner and outer slide assemblies, respectively; whereby, when said toothed member and said inner slide assembly are urged into engagement, at least one of said inner slide assembly slide members is received in an inner tooth gap of said toothed member to rotationally fix said inner slide member relative to said toothed member; and the remaining of said inner slide assembly slide members are urged to their retracted positions; and, when said toothed member and said outer slide assembly are urged into engagement, at least one of said outer slide assembly slide members is received in an outer tooth gap of said toothed member to rotationally fix said outer slide assembly relative to said toothed member; and the remaining of said outer slide assembly slide members are urged to their retracted positions.

21. A clutch comprising a toothed member and a slide assembly; said toothed member and slide assembly being moveable between a first position in which they are engaged with each other to transmit power and/or torque and a second position in which they are disengaged from each other to prevent the transmission of power and/or torque;

said toothed member comprising a surface which is generally cylindrical and a plurality of teeth extending from said surface;

said slide assembly member comprising a body having a circumferential surface which is generally cylindrical; a plurality of axially extending channels formed in said circumferential surface; said channels having a radial opening and a stop; a slide member and a resilient member received in each said channel; said slide member being moveable radially between an extended and a retracted position and including a tooth engaging portion which is sized and shaped to extend through said channel opening and a shoulder which engages said stop; said resilient member biasing said slide member to an extending position in which said tooth engaging portion extends through said opening and said slide member shoulder engages said stop;

said toothed member surface and said slide assembly surface being positioned such that when said toothed member and said slide assembly are urged into engagement, at least one of said slide members is received in a tooth gap (p) of said toothed member; and the remaining of said slide members are moved to their retracted positions; wherein p is defined as follows:

$$p \geq w_s + \delta;$$

where
$w_s$=the width of the slide member; and $$\delta = \pi\phi\frac{|S-T|}{S \cdot T}; \text{ where:}$$

$\phi$=tooth pitch diameter;
S=the number of sliding members;
T=the number of toothed members; and
|S−T| denotes the absolute value of the difference between the number of sliding members and the number of toothed members.

22. The clutch of claim 21 wherein said slide assembly body comprises a cylindrical member having a front surface and a back surface; said channel extending between said front and back surfaces to be open on axial ends thereof; said slide assembly further including a front cover plate and a back cover plate; said cover plates being sized to close the open axial ends of said channel and including axial extending lips which extend over a portion of said channel such that said channel radial opening has a length shorter than said channel; said stop comprising said lips of said cover plates.

23. The clutch of claim 22 wherein said slide member comprises a base portion having a length greater than the length of said radial opening; said tooth engaging portion being sized to extend through said radial opening; said tooth engaging portion and said base defining said shoulder.

24. The clutch of claim 23 wherein said tooth engaging portion is generally trapezoidal in elevation.

* * * * *

UNITED STATES PATENT AND TRADEMARK OFFICE
CERTIFICATE OF CORRECTION

PATENT NO. : 6,745,882 B2
DATED : June 8, 2004
INVENTOR(S) : Xiaolan Ai

It is certified that error appears in the above-identified patent and that said Letters Patent is hereby corrected as shown below:

Column 13,
Line 47, delete "is a postive integer (g)."

Column 15,
Line 7, replace $\delta = \pi\delta \frac{|S-T|}{S \cdot T}; where:$ with $\delta = \pi\phi \frac{|S-T|}{S \cdot T}; where:$ Signed and Sealed this Twenty-fourth Day of August, 2004

JON W. DUDAS
*Director of the United States Patent and Trademark Office*